United States Patent
Serizawa et al.

(10) Patent No.: US 11,982,992 B2
(45) Date of Patent: May 14, 2024

(54) TASK AND CYCLE TIME DETECTION METHOD AND SYSTEM

(71) Applicant: Hitachi, Ltd., Tokyo (JP)

(72) Inventors: Yasutaka Serizawa, Cupertino, CA (US); Sudhanshu Gaur, Cupertino, CA (US)

(73) Assignee: HITACHI, LTD., Tokyo (JP)

( * ) Notice: Subject to any disclaimer, the term of this patent is extended or adjusted under 35 U.S.C. 154(b) by 466 days.

(21) Appl. No.: 17/391,848

(22) Filed: Aug. 2, 2021

(65) Prior Publication Data
US 2023/0031390 A1 Feb. 2, 2023

(51) Int. Cl.
*G05B 19/4155* (2006.01)
*G06N 20/00* (2019.01)
*G06V 10/70* (2022.01)

(52) U.S. Cl.
CPC ......... *G05B 19/4155* (2013.01); *G06N 20/00* (2019.01); *G06V 10/70* (2022.01); *G05B 2219/31368* (2013.01)

(58) Field of Classification Search
CPC ...... G05B 19/4155; G05B 2219/31368; G05B 2219/31395; G06N 20/00; G06V 10/70; G06V 10/762; G06V 20/46; G06V 20/52; G06Q 10/0633; G06Q 10/06398
See application file for complete search history.

(56) References Cited

U.S. PATENT DOCUMENTS

| | | | |
|---|---|---|---|
| 2012/0029963 A1* | 2/2012 | Olding | G06Q 10/06311 705/7.14 |
| 2013/0342652 A1* | 12/2013 | Kikkeri | B25J 9/104 348/46 |
| 2019/0258985 A1* | 8/2019 | Guastella | G06N 20/00 |
| 2019/0347597 A1* | 11/2019 | Asendorf | H04B 1/385 |

OTHER PUBLICATIONS

Madrid, F. et al. "Matrix Profile XX: Finding and Visualizing Time Series Motifs of All Lengths using the Matrix Profile" in 2019 IEEE International Conference on Big Knowledge (ICBK), Nov. 2019, 8 pages.

* cited by examiner

*Primary Examiner* — Huo Long Chen
(74) *Attorney, Agent, or Firm* — Procopio, Cory, Hargreaves & Savitch LLP

(57) ABSTRACT

Example implementations described herein involve systems and methods that can involve extracting features from each of a plurality of time-series sensor data, the plurality of time-series sensor data associated with execution of one or more operations; clustering the extracted features into a plurality of tasks that occur from execution of the one or more operations, each of the plurality of tasks associated with a clustering identifier (ID) from the clustering; and calculating a cycle time of the cycle based on the initiation and end of the cycle recognized by referencing a cycle pattern model, wherein the cycle pattern model comprises configuration information of a cycle including a set from a plurality of the clustering IDs.

13 Claims, 16 Drawing Sheets

TASK AND CYCLE TIME DETECTION METHOD AND SYSTEM

BACKGROUND

Field

The present disclosure is generally directed to smart manufacturing systems, and more specifically, to task and cycle time detection in smart manufacturing systems.

Related Art

In smart manufacturing, which is one of the goals of Industrial Internet of Things (IoT), the improvement of overall equipment effectiveness (OEE) has been recognized as a universal and common problem. In the manufacturing field, the manufacturing model based on 4M (Man, Machine, Material, and Method) is generally used, with which the approach to improve the OEE of the entire plant has been made by acquiring insights for direct or indirect improvement of OEE from each 4M-related data. For example, OEE of the manufacturing site is expected to improve in total with multiple approaches such as: capturing raw material supply shortage or the retention and quality of work in progress (WIP) by tracking the material and product (Material), achieving the optimal human resource allocation according to the ability by tracking workers (Man), and reducing downtimes by early detecting the abnormality of manufacturing equipment (Machine).

Especially with respect to workers (Man), the visualization of the so-called "task and cycle time", which is defined as how long it takes for a worker to complete a series of tasks (=cycle) as well as who did it, is recognized as a challenge to find the bottleneck of the manufacturing processes and optimally re-arrange entire resources. FIG. 1 and FIG. 2 illustrates a typical cell-type manufacturing process and a definition of cycle and a task in a sequence of manufacturing cells respectively. As these figures show, in a manufacturing cell a sequence of multiple "tasks" (e.g. pick two cushions, pick hose, clip hose, and so on) are executed repeatedly. The unit of the repeated tasks are called "cycle". Therefore, a "cell" contains "cycles", and a cycle contains "tasks".

In the past, workers task and cycle time detection was technically difficult because of its large diversity of individual worker behavior. However, with the advancement of human action recognition technology based on machine learning, implementations that can absorb diversity have started to be developed.

On the other hand, in related art implementations using the latest machine learning, the task and cycle time are detected by using the results of classifying/identifying workers operations with Red Green Blue (RGB) camera or depth camera (e.g. ToF camera, LiDAR), and associating them with a timestamp. However, for each time and lace such implementations are deployed, there is a need to prepare the image data and annotation data as a dataset (e.g. {image i, Class j}), and customize machine learning model, which results in huge costs to the systems deployment.

SUMMARY

Aspects of the present disclosure can include a method, which can involve extracting features from each of a plurality of time-series sensor data, the plurality of time-series sensor data associated with execution of one or more operations; clustering the extracted features into a plurality of tasks that occur from execution of the one or more operations, each of the plurality of tasks associated with a clustering identifier (ID) from the clustering; and calculating a cycle time of the cycle based on the initiation and end of the cycle recognized by referencing a cycle pattern model, wherein the cycle pattern model comprises configuration information of a cycle comprising a set from a plurality of the clustering IDs.

Aspects of the present disclosure can include a computer program, which can involve instructions involving extracting features from each of a plurality of time-series sensor data, the plurality of time-series sensor data associated with execution of one or more operations; clustering the extracted features into a plurality of tasks that occur from execution of the one or more operations, each of the plurality of tasks associated with a clustering identifier (ID) from the clustering; and calculating a cycle time of the cycle based on the initiation and end of the cycle recognized by referencing a cycle pattern model, wherein the cycle pattern model involves configuration information of a cycle comprising a set from a plurality of the clustering IDs. The instructions can be stored in a non-transitory computer readable medium and executed by one or more processors.

Aspects of the present disclosure can include a system, which can involve means for extracting features from each of a plurality of time-series sensor data, the plurality of time-series sensor data associated with execution of one or more operations; means for clustering the extracted features into a plurality of tasks that occur from execution of the one or more operations, each of the plurality of tasks associated with a clustering identifier (ID) from the clustering; and means for calculating a cycle time of the cycle based on the initiation and end of the cycle recognized by referencing a cycle pattern model, wherein the cycle pattern model comprises configuration information of a cycle involving a set from a plurality of the clustering IDs.

Aspects of the present disclosure can include an apparatus, which can involve a processor, configured to extract features from each of a plurality of time-series sensor data, the plurality of time-series sensor data associated with execution of one or more operations; cluster the extracted features into a plurality of tasks that occur from execution of the one or more operations, each of the plurality of tasks associated with a clustering identifier (ID) from the clustering; and calculate a cycle time of the cycle based on the initiation and end of the cycle recognized by referencing a cycle pattern model, wherein the cycle pattern model comprises configuration information of a cycle involving a set from a plurality of the clustering IDs.

DETAILED DESCRIPTION

Figure 1:
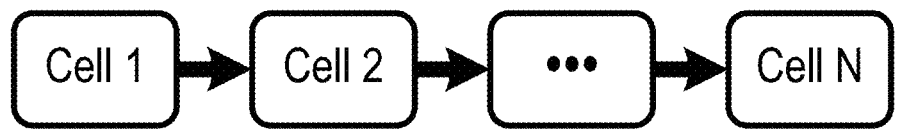
FIG. 1 and FIG. 2 illustrate a related art cell-type manufacturing process and a definition of cycle and a task in a sequence of manufacturing cells, respectively.
Figure 2:
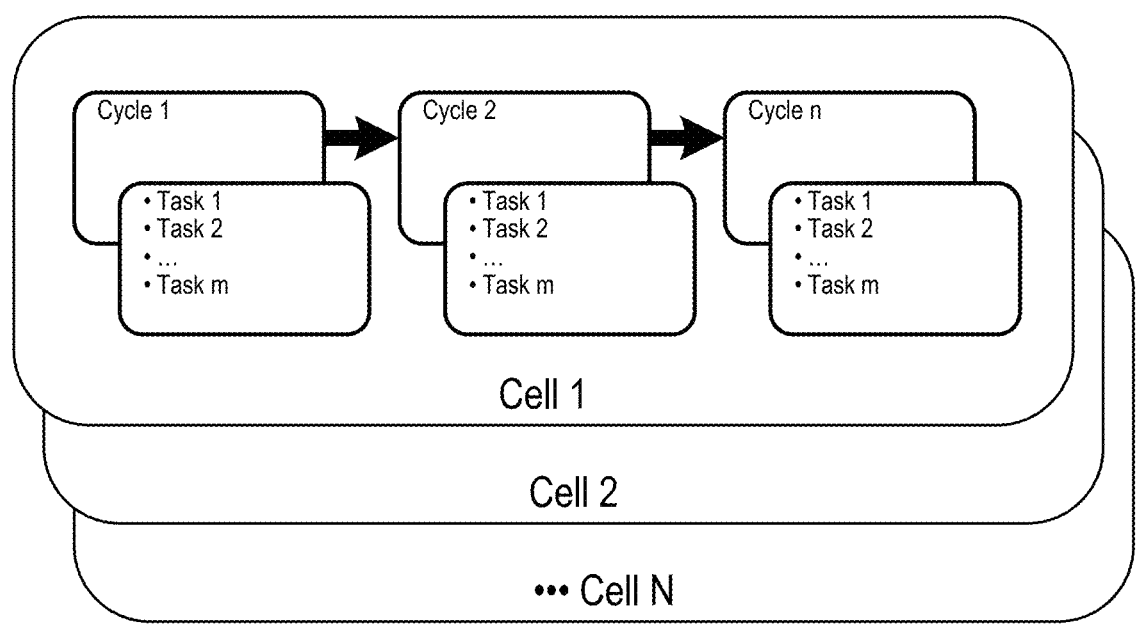

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In an example implementation, there is a system for task and cycle time detection as described herein.

Figure 3:
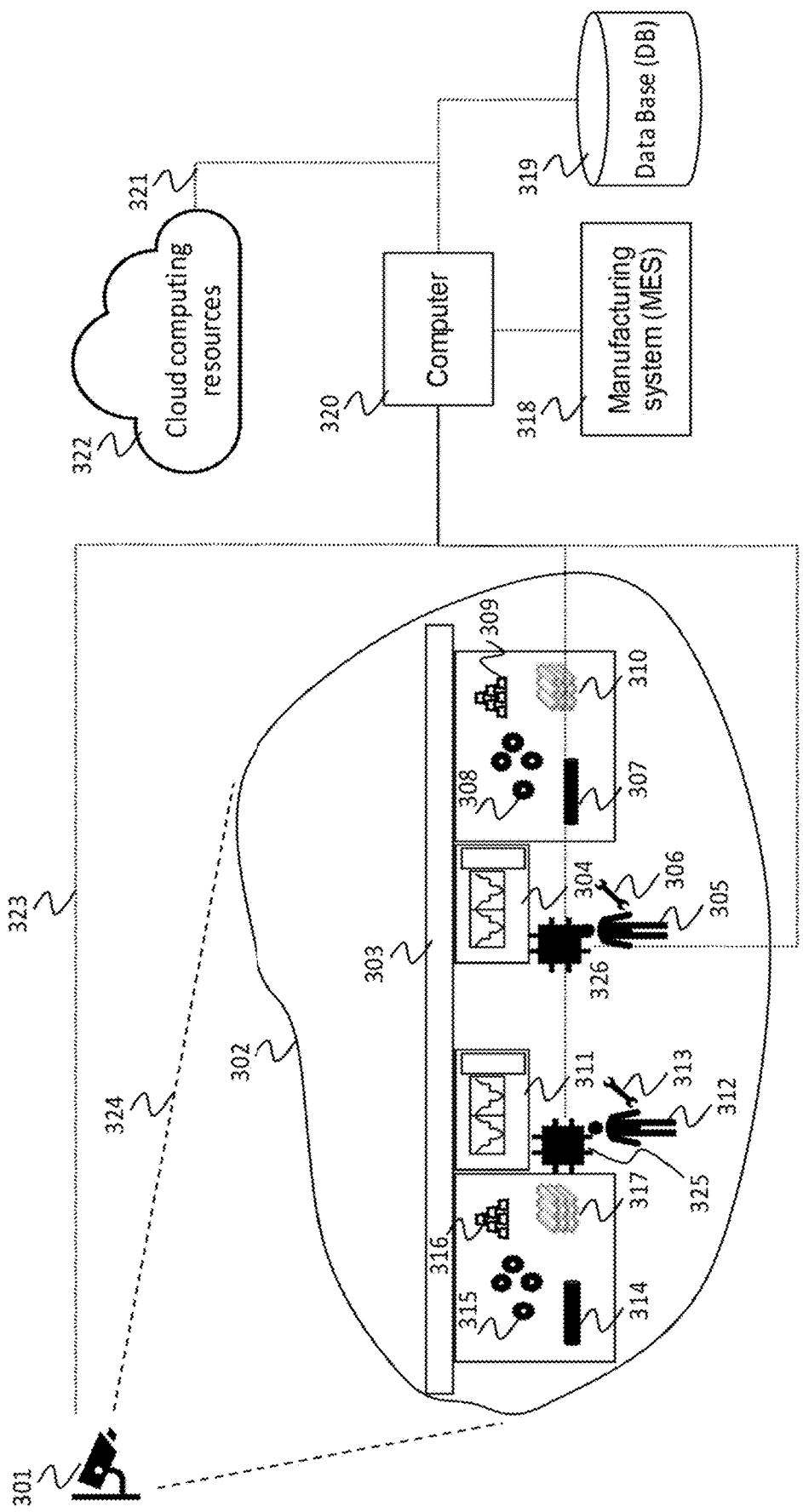
FIG. 3 illustrates an example overview of the system, in accordance with an example implementation.

FIG. 3 illustrates an example overview of the system, in accordance with an example implementation. Camera 301 and sensors 325, 326 installed in the factory captures a plurality of manufacturing cells 302, where along the conveyor belt 303 across the plurality of cells, workers 305, 312 with tools 306, 313 are performing machining and assembly works using materials 307, 308, 309, 310, 314, 315, 316, 317 and machines 304, 311. The sensors 325, 326 can be installed on machine 304, 311, workers 305, 312, tools 306, 313, or materials 307, 308, 309, 310, 314, 315, 316, 317 such as wearable IMU (Inertial Measurement Unit) sensor, vibration sensors, or acoustic sensors. The workers provide the finished products or work in progress products to the conveyor belt 303. This video and image taken with the camera and the time-series data from sensors are transferred to the computer 320 via the communication line 323. After processing by computer 320, the processed data are stored in the database 319 and are further processed in conjunction with the cloud computing resources 322 via network 321. In addition, when the data processing executed by the computer 320 is linked with appropriate information from the manufacturing execution system (MES) 318, effective data processing in computer 320 can thereby be achieved. Although the above example involves human workers, the example implementations described herein are not limited thereto and can involve any system that executes a certain type of operation repeatedly, such as processes executed by robot or machine. Further, the time-series sensor data generated by the camera or sensors does not necessarily need to be directed to the human workers, but can involve video capture of the machines, video capture of the facility while it is executing a certain cycle operation, sensor data directed solely to the machine during a certain cycle operation, and so on in accordance with the desired implementation.

Figure 4:
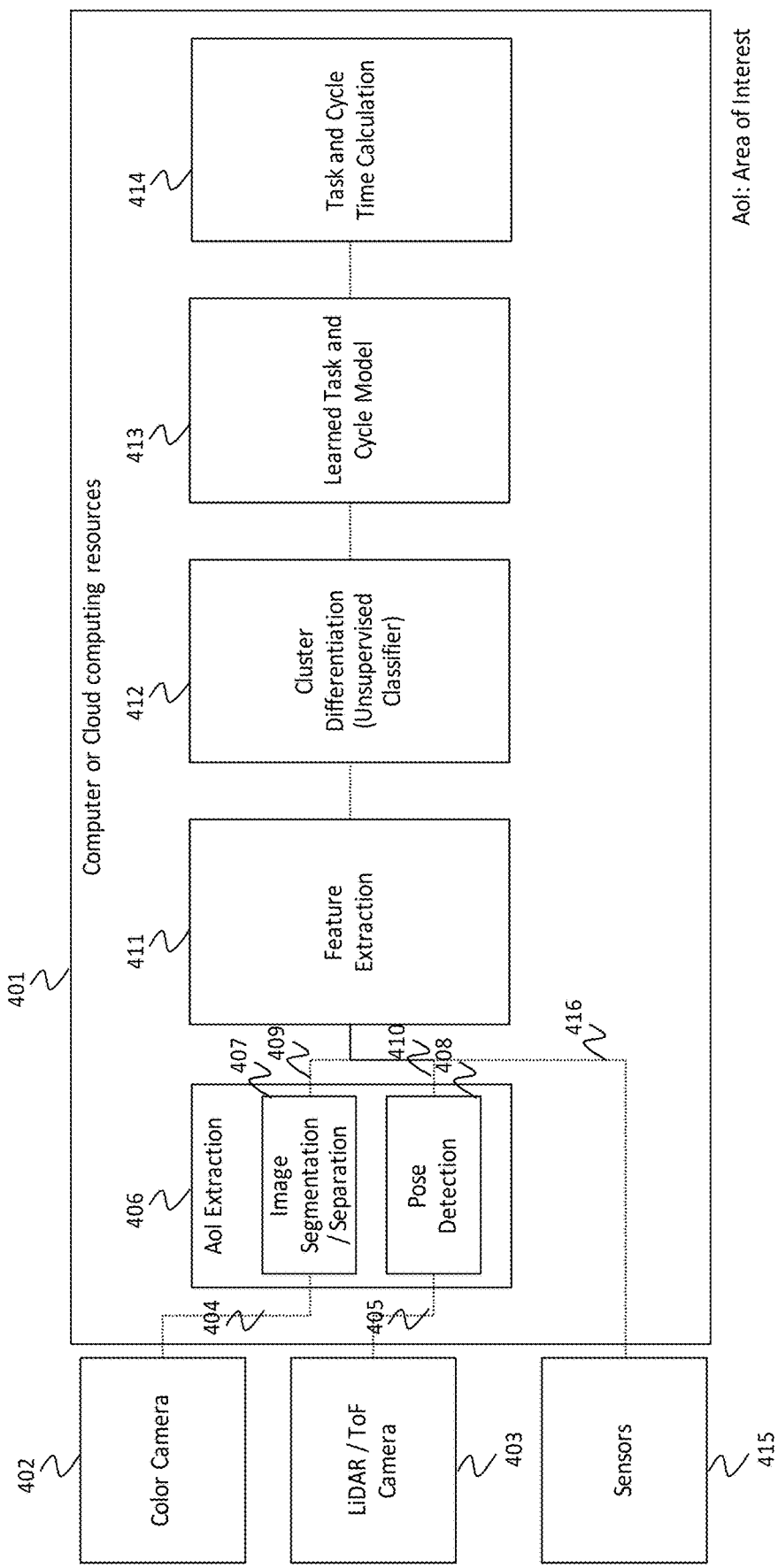
FIG. 4 illustrates a functional block diagram in computer or cloud computing resources, in accordance with an example implementation.
Figure 5:
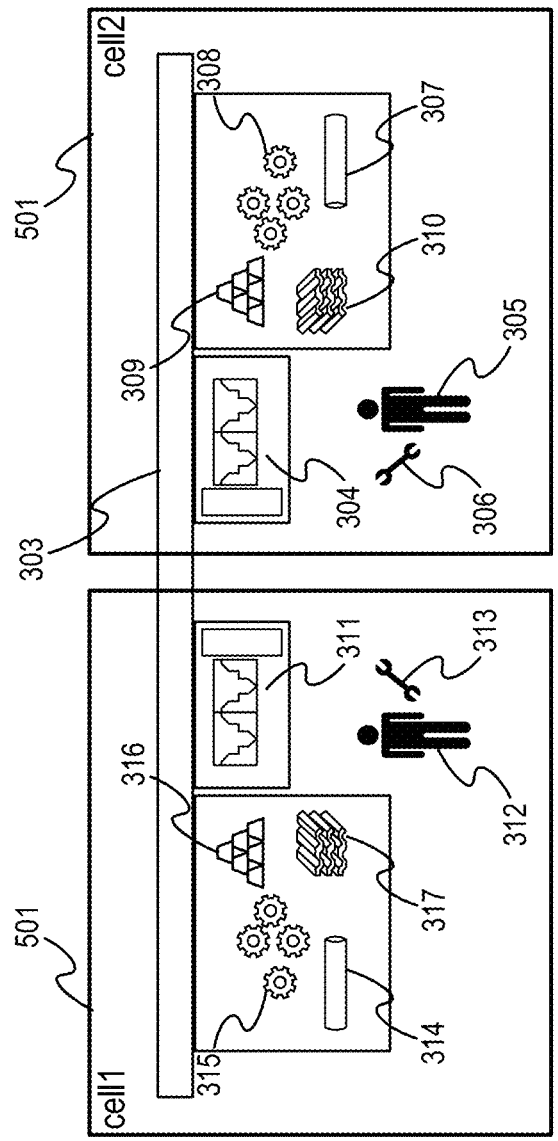
FIG. 5 illustrates an example of the image obtained by color camera and LiDAR/ToF camera, in accordance with an example implementation.

FIG. 4 illustrates a functional block diagram in computer or cloud computing resources, in accordance with an example implementation. Video data and images obtained by color camera 402, light detection and ranging/top of flight (LiDAR/ToF) camera 403, or the sensors such as wearable IMU, vibration sensors, and acoustic sensors (microphone) 415 is provided as input 404, 405 to AoI (Area of Interest) extraction block 406 and input 416 to directly to feature extraction block 411. In FIG. 5, an example of the image obtained by color camera 402 and LiDAR/ToF camera 403 and the sensors such as wearable IMU, vibration sensors, and acoustic sensors (microphone) 415 is shown. As for the image obtained here contains the same range as the image 302 in the field of view 324 of the camera 301 in FIG. 3 and is composed of cell1 501 and cell2 502. All the data from color camera, LiDAR/ToF camera, and other sensors 415 are combined into a sensor data stream and input into the feature extraction block 411 to output feature values.

Figure 6:
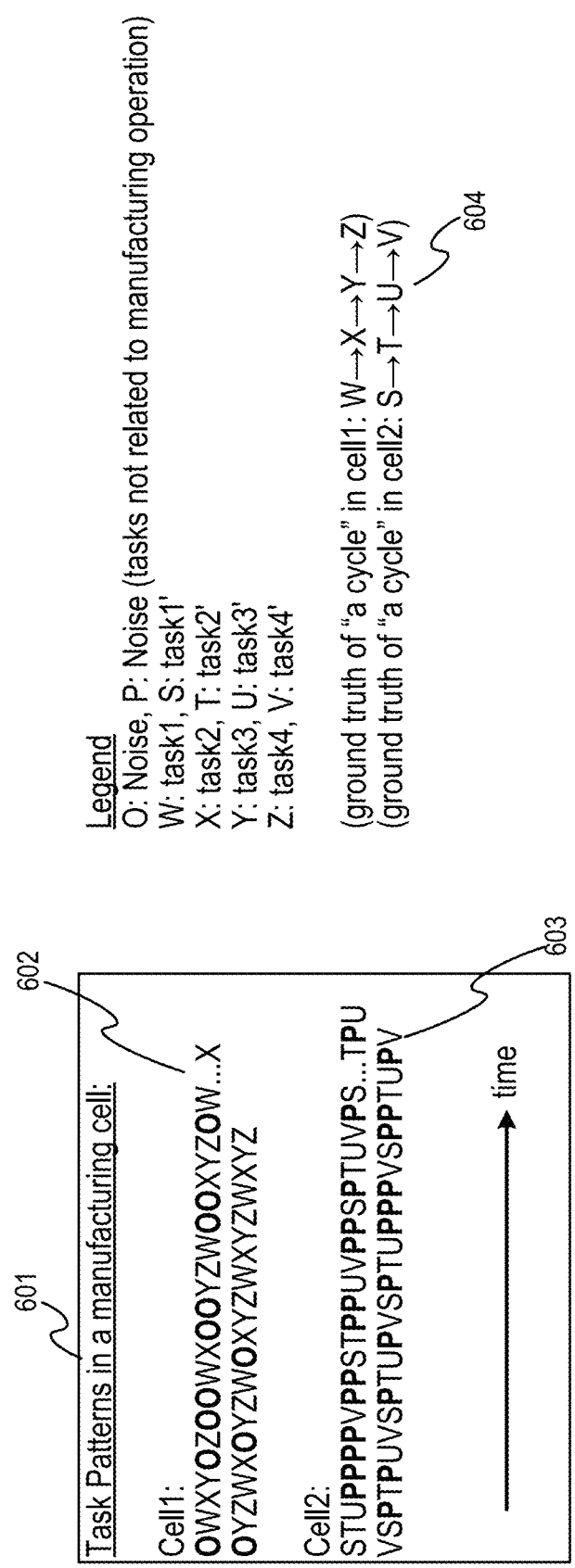
FIG. 6 illustrates an example of sequence of the tasks executed in multiple cells, in accordance with an example implementation.

In these cells, a series of tasks and cycles shown in FIG. 6 are executed. FIG. 6 illustrates an example of sequence of the tasks executed in multiple cells, where each four tasks in cell1 and cell2 as shown in the 601 (cell1: W, Task1: X, Task2: Y, Task3: Z, Task4 cell2 S, Task1': T, Task2': U, Task3': V) is executed in the order shown in 602 and 603. Here, O and P show the operation of the worker other than tasks contained in the cycle in cell1 and cell2 (such as short rest, or stretching the body), which in the present system is treated as noise, and is recognized as a factor to increase the task and cycle time. The ground truth of "a cycle" in this example as shown in 604 is "W→X→Y→Z" for cell1 and "S→T→U→V" for cell2. AoI extraction block 406 is composed of image segmentation/separation block 407 and pose detection block 408. Image segmentation/separation block 407 receives the red green blue (RGB) images stream from the color camera 402, extracts image streams containing only the worker, the image streams containing only materials in the vicinity of the worker (especially in the vicinity of the hand), and image streams containing only the background as output 409. Thus, improvement of the extraction accuracy of the subsequent feature extraction 411 is expected. Further, using the depth images of LiDAR/TOF camera, pose detection block 408 extracts the skeleton information of the worker's body (skeletal data) and provides as output 410. This makes it possible to detect the behavior of the worker more accurately, which contributes to the improvement of the accuracy of the subsequent feature extraction block 411. Here, all the data from color camera 402, LiDAR/ToF camera 403, and other sensors 415 are combined into a data stream and input into the feature extraction block 411 to output feature values.

The data processed by AoI extraction block 406 is input to the feature extraction block 411 as an integrated data. Feature extraction block 411 implements a typical deep neural network (DNN)-based well-trained machine learning model and outputs the feature value of the input data. One example implementation of the feature extraction block 411 is the 3D convolutional neural network, where the input images themselves and optical flows derived from the input images are ingested as separate streams (total two streams), and a sequence of multiple images and optical flows in time-series manner are utilized as input data instead of only one frame image and optical flow to make it possible to track the time series "movement=action" and output clearly differentiated feature values. Feature values outputted by the feature extraction block 411 is inputted to the cluster differentiation block 412.

Figure 7:
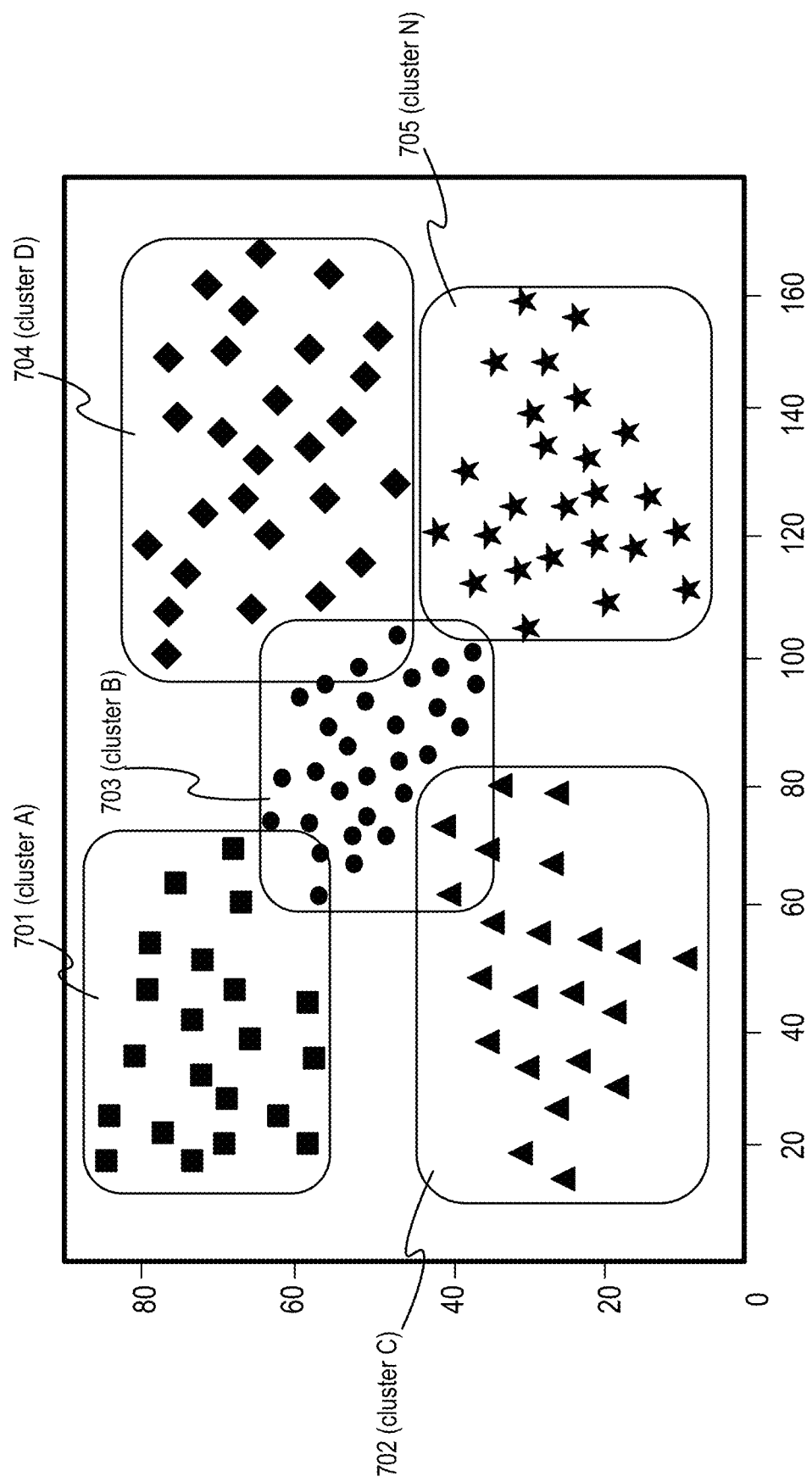
FIG. 7 illustrates the example of clustering results from cluster differentiation block, in accordance with an example implementation.

Cluster differentiation block 412 is an unsupervised classifier and classifies the input features into n-dimensional clusters. FIG. 7 illustrates the example of clustering results from cluster differentiation block 412, in accordance with an example implementation. In this case, four tasks in each cell described above (WXYZ, and STUV)+noise O or P classified into five clusters 701, 702, 703, 704 and 705 are shown (cluster ID: A, B, C, D, N). Thus, the input feature value data are converted into cluster IDs information. The implementation examples of cluster differentiation 412 can include a k-means/x-means/g-means method with elbow method for detecting the number of clusters which facilitates automatic generation of the number of clusters based on learning-based algorithms, a GMM (Gaussian Mixture Model), and so on in accordance with the desired implementation. The cluster IDs information output from cluster differentiation block 412 is input to the learned task and cycle model block 413.

Figure 8:
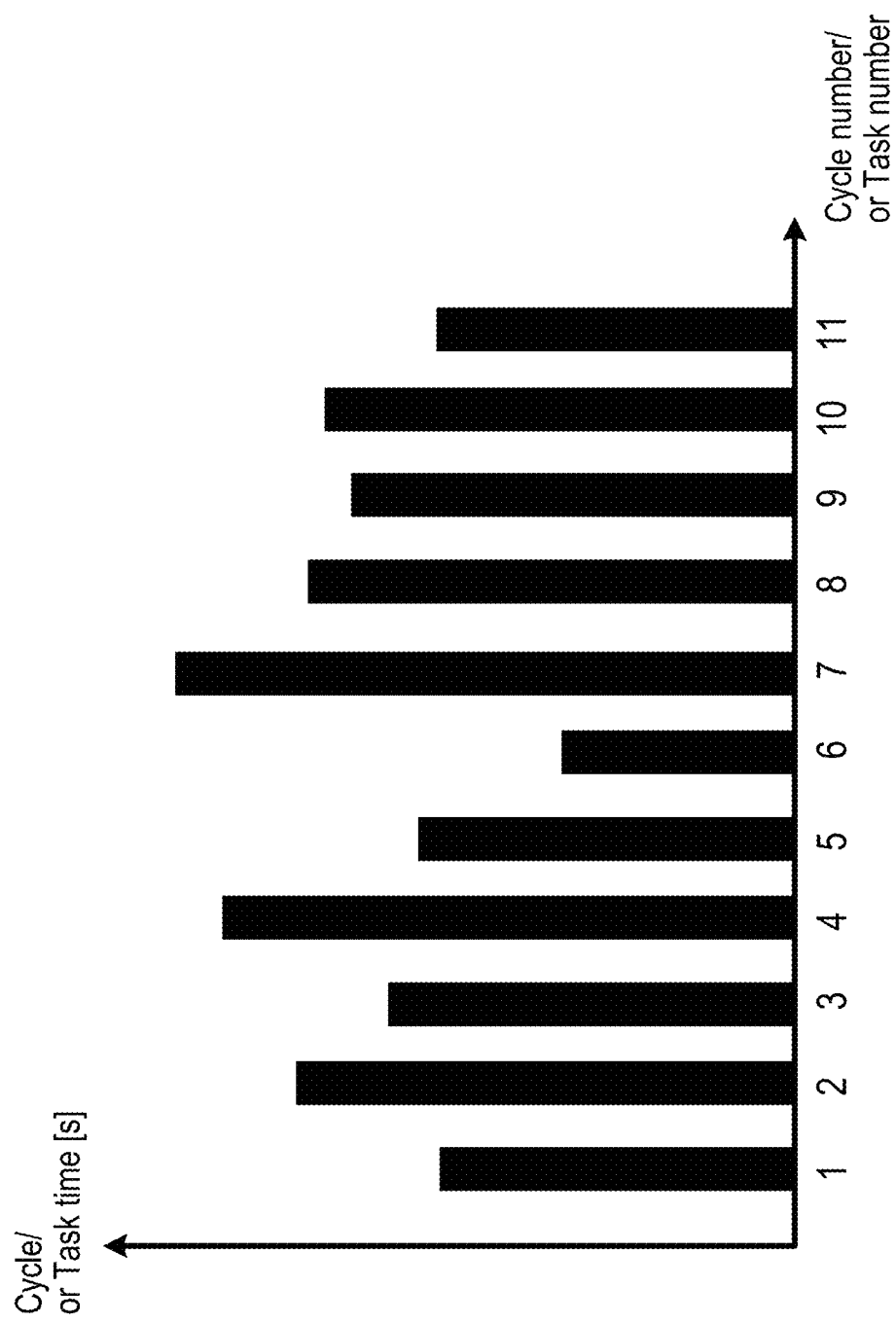
FIG. 8 illustrates an example output result of the task and cycle time detection, in accordance with an example implementation.

Learned task and cycle model block 413 can involve the learning of the order information of the pattern expressed in the cluster ID where the order of execution of the tasks in the cycle acquired by learning algorithm are described. For example, in the case of the above mentioned cell1, tasks in a cycle are repeated in the order of W→X→Y→Z, and if the corresponding relationship between tasks and cluster IDs such as "W: Cluster A, X: Cluster B, Y: Cluster C, Z: Cluster D, O: cluster N", is found in cluster differentiation block 412, this pattern order information of the cluster "A→B→C→D" is exactly the learned task and cycle model. Through use of the data pipeline in 401, since the cluster IDs are automatically output from a data stream of the images of color camera 402, LiDAR/ToF camera 403, and time series data from the sensors such as wearable IMU, vibration sensors, and acoustic sensors (microphone) 415, once it is possible to obtain the learned task and cycle model information, the task and cycle time can be calculated by the equation of "the time when cluster D is lastly detected—the time when cluster A is firstly detected". This calculation is executed by the task and cycle time calculation block 414. FIG. 8 illustrates an example output result of the task and cycle time detection, in accordance with an example implementation. Although the learned task and cycle model block 413 illustrated here is involved in the learning of the pattern (i.e., tasks executed in a specific order), the example implementations can also be extended to learning sets of tasks instead depending on the desired implementation. For example, for cycle operations in which the order execution of the tasks are not important, the example implementations described herein can be directed to identifying the cycle as a set of tasks without regard to a particular order for such operations.

In an example implementation, a method for generating learned task and cycle model from stored historical data is described herein.

Figure 9A:
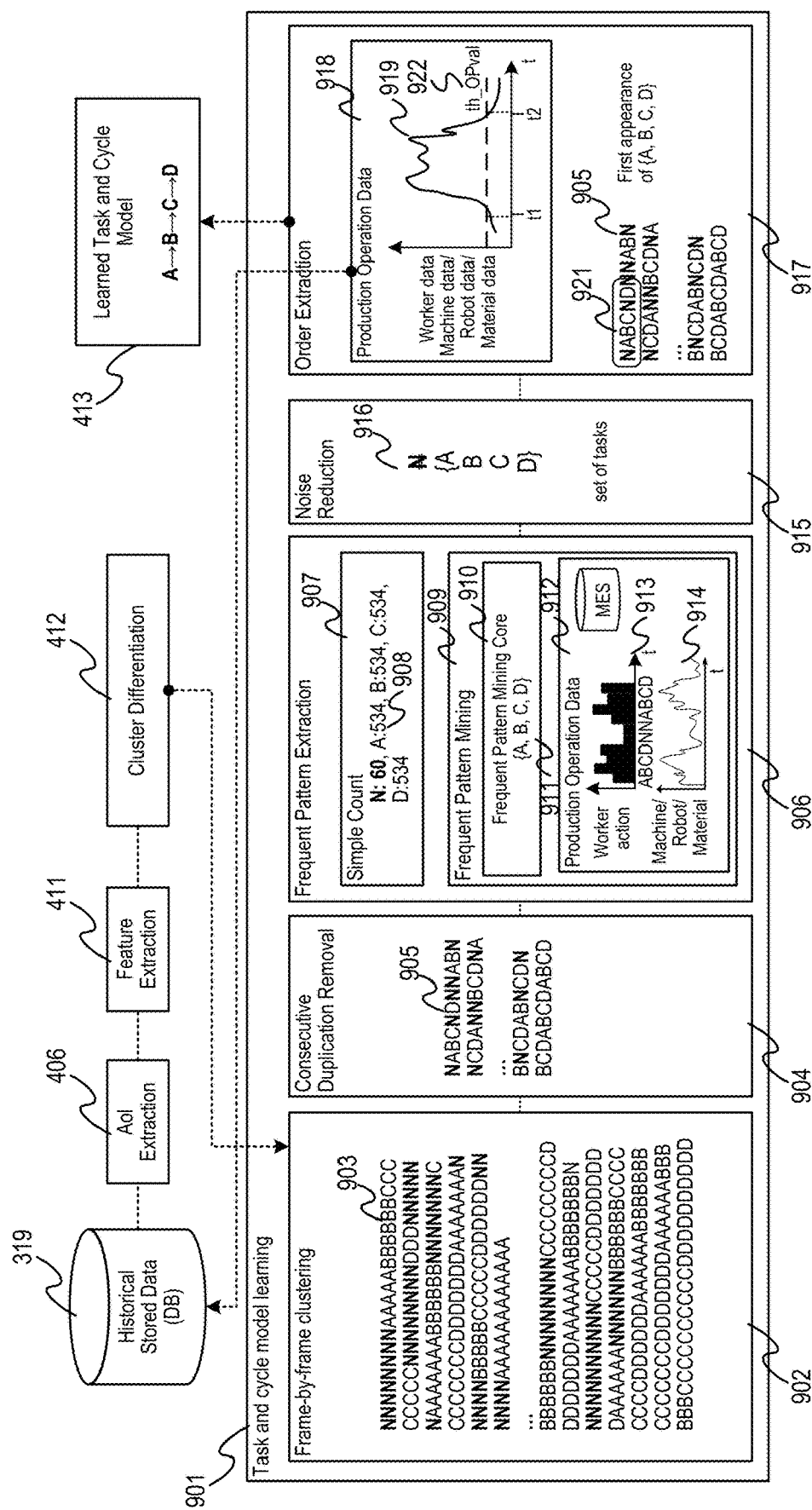
FIG. 9(A) illustrates an example process of learning the task and cycle model from the historical data of color camera and LiDAR/ToF camera stored in database, in accordance with an example implementation.

FIG. 9(A) illustrates an example process of learning the task and cycle model from other previous data such as the historical data of color camera 402, LiDAR/ToF camera 403, and time series data from the sensors such as wearable IMU, vibration sensors, and acoustic sensors (microphone) 415 stored in database 319, in accordance with an example implementation. Using a historical data stored for a certain amount of time, the process 319→406→411→412 similar to the process described in example of execution1 is executed. Here, all the data from color camera 402, LiDAR/ToF camera 403, and other sensors 415 are combined into a data stream and input into the feature extraction block 411 to output feature values. The output is entered into the task and cycle time model learning block 901 as a sequence of frame-by-frame clustering results. In the example described in FIG. 9(A), an example of frame-by-frame clustering results is shown as 903 as generated by frame-by-frame clustering 902, and each character of A, B, C, D, N which appears multiple times shows the clustering results in frame-by-frame manner. For the frame-by-frame clustering result 903, successive character duplications are removed at consecutive duplication removal block 904 and the frame-by-frame data are converted into time-series appearance order of clusters 905. This result is entered in the frequent pattern extraction block 906, and under the assumption of "tasks to be focused on would be repeated much more than other situations (=noise)" at first that is processed by simple count block 907.

In simple count block 907, the occurrence frequency is calculated for all the characters (here, A, B, C, D, N) as shown at 908. Then, if the condition "the maximum count number−the minimum count number>threshold value" is satisfied, the clustering accuracy is recognized as sufficient, and the characters which can meet the condition "the count number of the character>the minimum count number+threshold value/2" are recognized as the clustering results from tasks to be detected, and other characters are treated as noise. On the other hand, if it does not satisfy the condition of "maximum count number-minimum count>threshold value", the clustering accuracy is determined to be insufficient, and the time-series appearance order of clusters 905 is processed by frequent pattern mining block 909 to extract the frequent pattern. Frequent pattern mining core block 910, under the assumption of "tasks to be focused on would be repeated much more than other situations (=noise)", the process of extracting the most frequent character set from a series of strings such as 905 is executed, in this example, the frequent pattern mining core block 910 finds out that {A, B, C, D} 911 is a collection (or a "set") of cluster IDs associated with the manufacturing tasks (in other words, finding out that N is noise). Here, as a specific method of frequent pattern mining, for example, an algorithm of series pattern mining using projection can be utilized. By extracting only the items that exist after the series to be projected from the series data and repeating the projection with a priority on depth, the frequently occurring series pattern is effectively discovered. This makes it possible to recursively search for longer frequently occurring series from simply short frequently occurring series. When using such a method, in order to accurately extract the most frequent pattern of character set, the number of tasks to be extracted and typical rough task and cycle time information are very useful. Other implementations for extracting the most frequent pattern set can also be used, and the present disclosure is not particularly limited.

Figure 10:
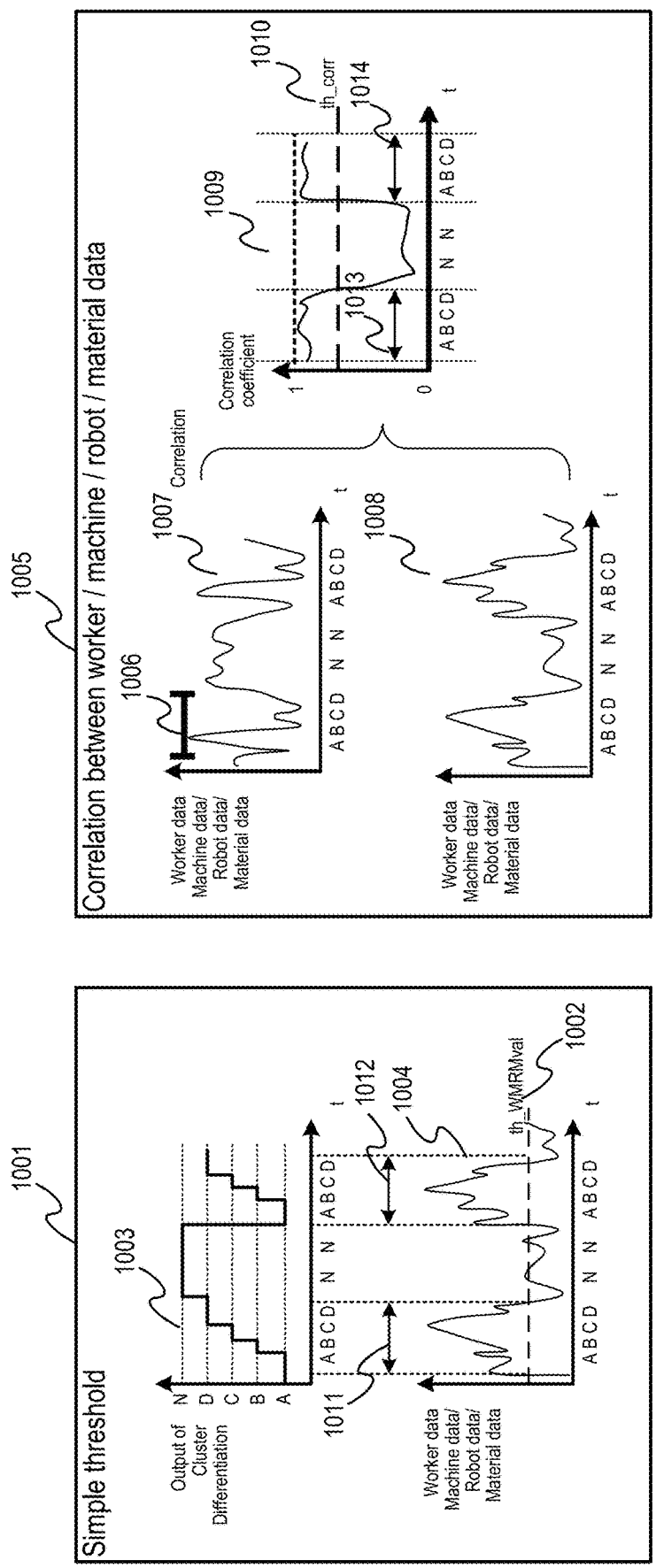
FIGS. 10 and 11 illustrate an example of the method to obtain the number of tasks, and the typical rough task/cycle time, in accordance with an example implementation.
Figure 11:
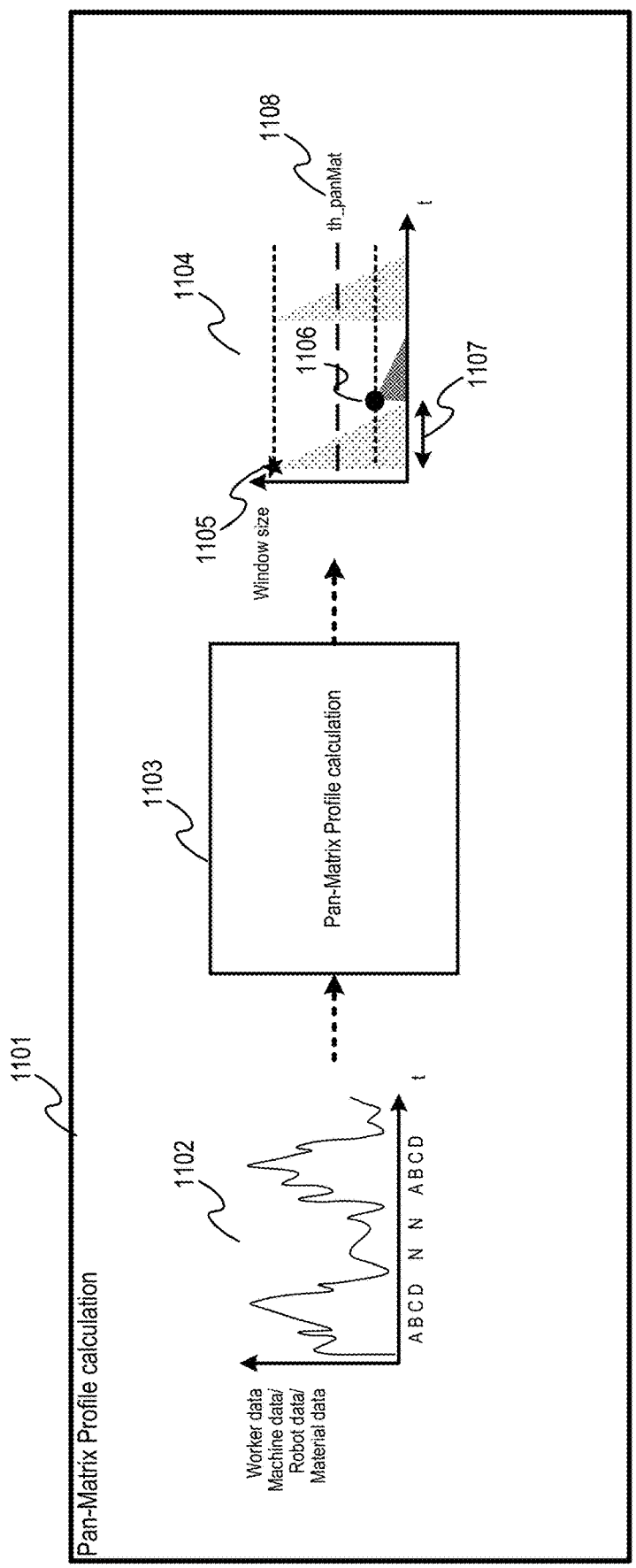

Production operation data shown in 912 can involve worker action information 913 and time-series data of machine, robot, and materials 914 stored in MES. By comparing them with time synchronization, it is possible to obtain the number of tasks and typical rough task and cycle time. FIGS. 10 and 11 illustrate an example of the method to obtain the number of tasks, and the typical rough task/cycle time, in accordance with an example implementation. In FIG. 10, the method using the simple threshold 1001, and the method using correlation between multiple types of data 1005 (i.e., at least two) associated with the manufacturing system such as worker, machine, robot, material data, and so on are shown. In the method 1001 using the simple threshold, comparing the graph 1003 plotting the output of the consecutive duplication removal block 904 with worker data, machine data, robot data, or material data 1004 after the time synchronization process, make it possible to extract the time range of 1011, 1012 with more operational activity (value) using a constant threshold in 1004 (th_WMRMval 1002). Then, by obtaining the cluster IDs contained in the same time range 1011, 1012 in 1003, it is possible to calculate the task number as well as the rough tasks and cycle time. Here, as examples of production operation data the followings can be assumed:

Worker data: Movement of center of gravity of the worker, IMU (Inertial Measurement Unit) data from wearable devices Machine data: Programmable Logic Controller (PLC) data, sensor data to monitor the state of the machine Robot data: PLC data, sensor data to monitor the state of the robot Material data: Measured number or position of materials (raw materials, work in progress, tools)

In the method 1005 using the correlation, comparing the two types of data 1007 and 1008 (e.g. worker data and machine data) with the constant time window 1006, the calculated correlation coefficients are plotted on a graph 1009. In correlation results plotted on the graph 1009, the time range of 1013 and 1014 when the correlation coefficient is the threshold (th_corr 1010) or more is calculated, and then by taking time synchronization with the consecutive duplication removal block 904, it become possible to know the number of tasks and typical rough tasks and cycle time.

Furthermore, as shown in FIG. 11, it is also possible to use the Pan-Matrix Profile calculation method 1101. In the Pan-Matrix Profile calculation, by using time series data such as 1102 as input data to the calculation unit 1103, the frequent pattern can be output in the way of 1104. Here in 1104, the horizontal axis shows the time, and the vertical axis shows the time window size, i.e., the time window that means what extent of the time period to the future from a certain time is considered, and black and white tint indicates the z-normalized Euclidean distance between the partial time-series data for the time window in a certain time and that the partial time-series data most similar to that 1102 (white: 1, Black: 0). Therefore, if the pattern is present in the time series data, the pattern on the triangle as shown in 1104 can be repeatedly obtained. Therefore, discovering a vertex of a triangle present above a certain threshold value (th_panMat 1108) and obtaining the length 1107 of the base of the triangle reveal typical rough tasks and cycle time. In 1104, there are two types of triangles whose vertices are specified as 1105 and 1106 respectively, where the vertex 1105 meets the condition (above a certain threshold value of th_panMat 1108). Further, by taking time synchronization with the output of consecutive duplication removal block 904, the example implementations can make it possible to calculate the number of tasks. Thus, since in frequent pattern extraction block 906, tasks {A, B, C, D} and noise {N} can be separated, it becomes possible to obtain a character set 916 by removing noise in noise reduction block 915.

At this stage, however, the results involve just the set of cluster IDs, whose order needs to be determined in order extraction block 917. In order to determine the order, the production operation data 918 (e.g., which is the historical sensor data of production operation) stored in the IVIES are utilized again. 919 shows the time series plot of the above mentioned production operation data including worker/machine/robot/material data. The time interval in which the value of data is more than th_Opval 922 (t1, and t2) is construed as in the production operation and time where the value of data is less than th_Opval 922 is understood as non-operation time. Then, when transferring the data from the original historical stored data 319 to AoI extraction 406, only the data in the range of t1-t2 should be utilized. Thus, it should be assured that in the output of consecutive duplication removal shown in 905, the cluster ID associated with the task to be executed first in a cycle (in the case of this example a) is guaranteed to be appeared in the beginning except noise. Therefore, in order extraction 917, tasks order can be found if attention is given to the first characters 921 from 905 except for the noise which became known in 906. Thus, it becomes possible to learn the learned task and cycle model 413.

Figure 9B:
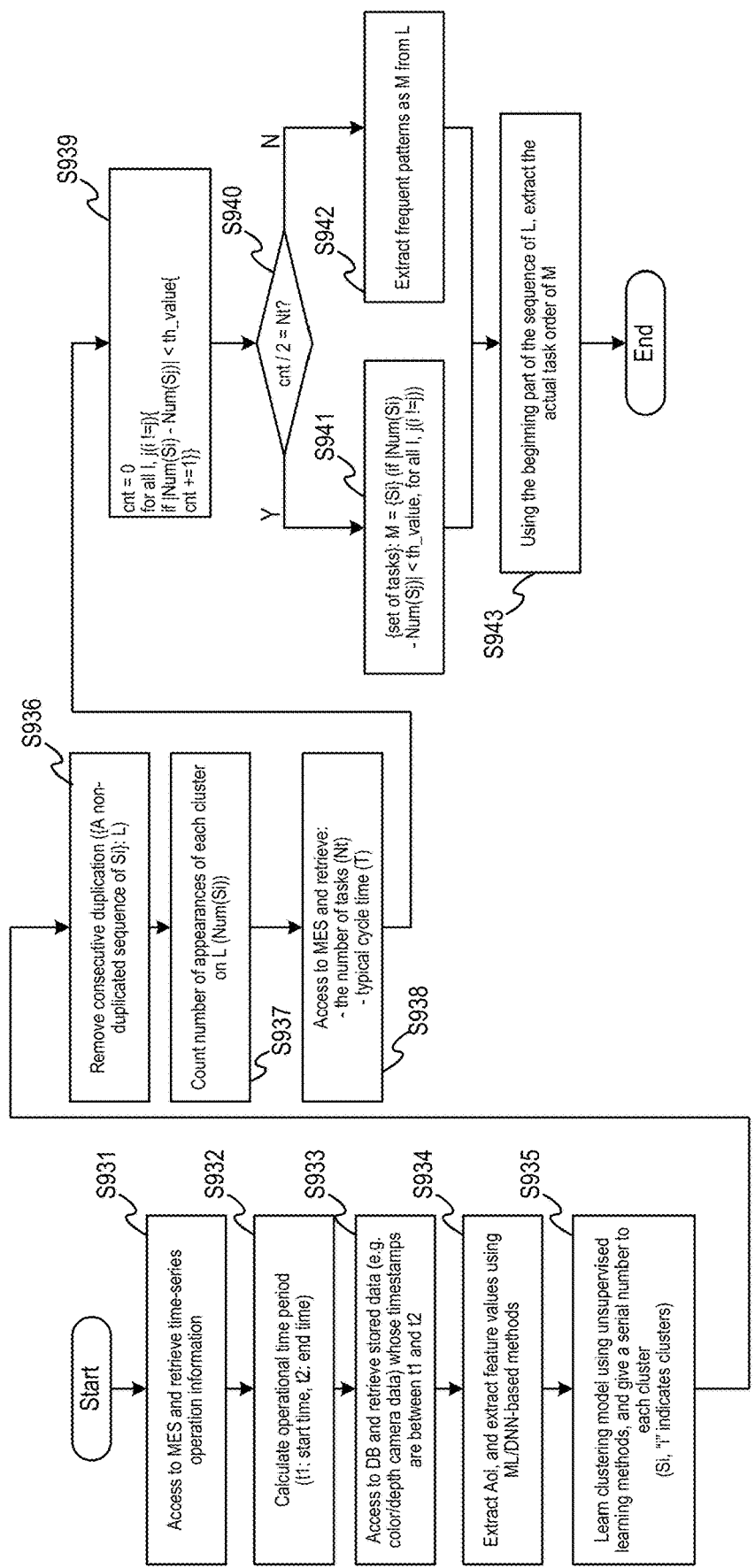
FIG. 9(B) illustrates an example system flowchart of learning task and cycle model, in accordance with an example implementation.

FIG. 9(B) illustrates an example system flowchart of learning task and cycle model, in accordance with an example implementation. At first, the system accesses to the MES and get time-series production operation information (S931) and calculate operational time period (S932) (t1: start time, t2: end time, as shown in 919). This, as described in FIG. 9(A) for order extraction block 917, obtains time-series operation data such as 918, determines the activity in the cell by the threshold th_OPval 922, and calculates the active time period. The system accesses to the database (DB) and retrieves the data of color camera 402, LiDAR/ToF camera 403, and time series data from the sensors such as wearable IMU, vibration sensors, and acoustic sensors (microphone) 415 which have timestamps between t1-t2 time period (S933). For that data, the system performs AoI extraction 406 and the feature extraction 411, and then obtain the feature amount 412 (S934). Furthermore, by applying the unsupervised learning method to the feature amount 412, the system learns the differentiated clusters (Si) to allocate the cluster ID to each cluster, where "i" indicates cluster IDs (S935). At this stage, since frame-by-frame clustering results are obtained in the representation of cluster IDs, so the system removes consecutive duplication and define a non-duplicated sequence of Si as L (S936). Then the system counts the number of occurrences for each cluster ID in L (defined as Num (Si)) (S937). Then the system accesses to IVIES again, obtains time-series operation information, and calculates the number of tasks (Nt) and typical cycle time (T), using the methods described in FIG. 10 and FIG. 11, (S938). Next, the clusterIDs which are not noise are extracted with comparison between Num(N) and Num({A, B, C, D}). Here, Num( ) is the function which calculates the number of a clusterID in a series of clusterIDs. At (S939), the count number (cnt) which can satisfy the condition of |Num (Si)−Num (Sj)|<th_value for all i, j (i!=j) is calculated. Using this condition, the system can calculate the value of "the number of tasks×2 (=cnt)" (in consideration on double count of combination for Si and Sj) by applying small value of th_value, under the assumption of Num(N)<<Num({A, B, C, D}) when comparing the cluster IDs corresponding to the tasks being monitored ({A, B, C, D}) and noise ({N}). Then, the system determines whether cnt/2 coincides with the Nt calculated previously (tasks number calculated from time-series operation data) (S940).

If yes (Y), the system determines the set of tasks with applying the condition of {set of tasks}: M={Si} (if |Num (Si)−Num (Sj)|<th_value, for all i, j (i !=j)) (S941). If no (N), it calculates the set of tasks with ingesting L (non-duplicated sequence of Si) into the frequent pattern mining method 909 of frequent pattern extraction block 906 and extracting the frequent pattern as details described above (S942) with applying the value of T as auxiliary information. And in (S943), as shown in 921, it determines the order of M by detecting the character {A, B, C, D} in the first beginning of L (the sequence of {Si}). This creates a learned task and cycle time model.

The example implementations described herein realize tasks and cycle time detection useful indicator to improve OEE for manufacturing cells without any data annotation operation, which contributes to a significant cost reduction in system deployment as well as high usability and scalability.

In another example implementation, the usage of task and cycle time detection is described herein.

As an example of utilizing the system and method described in the example implementations in the actual factory environment, the worker tracking system using an RFID and a camera and sensors which provide time series data such as wearable IMU, vibration sensors, and acoustic sensors (microphone) can be listed. In the example implementations, although the method and system for generating learned task and cycle model from stored historical data are disclosed, in this example, by utilizing the RFID, the camera, and the sensors, the method and system which manage task and cycle time information associated with worker ID/cell ID information are disclosed.

According to these, in manufacturing cells, it becomes possible to obtain in real time "who completed over" as well as "how long it takes", which makes it possible to serve the OEE improvement activities such as optimal assignment of resources in the factory.

Figure 12:
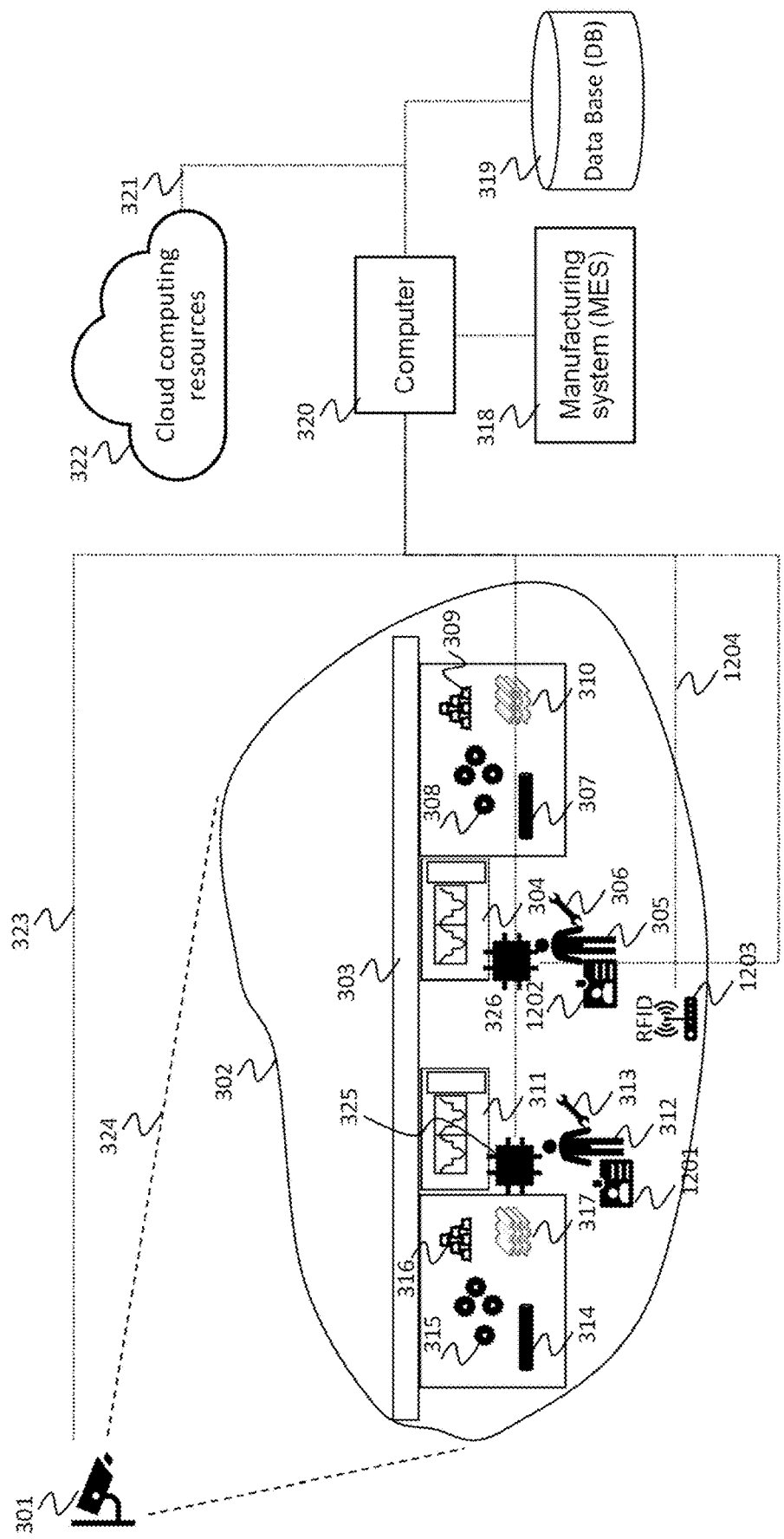
FIG. 12 illustrates an example of a factory site that implements RFID and cameras, in accordance with an example implementation.

FIG. 12 illustrates an example of a factory site that implements RFID, cameras, and sensors which provide time series streaming data such as wearable IMU, vibration sensors, and acoustic sensors (microphone), in accordance with an example implementation. An RFID reader 1203 is implemented in the manufacturing cell, and workers 305, 312 are assumed to have an RFID tag 1201, 1202, respectively. The RFID reader 1203, via the network 1204, is connected to the computer 320 and has an interface to the task and cycle time detection system described in an example implementation, which makes information integration possible. When the RFID tags 1201, 1202 associated with the workers are read at the time of entry and exit to the cell, the system synchronizes the image/pose of the worker acquired with the installed camera 301, time series data from the sensors 325, 326, and the information from RFID reader 1203.

Figure 13:
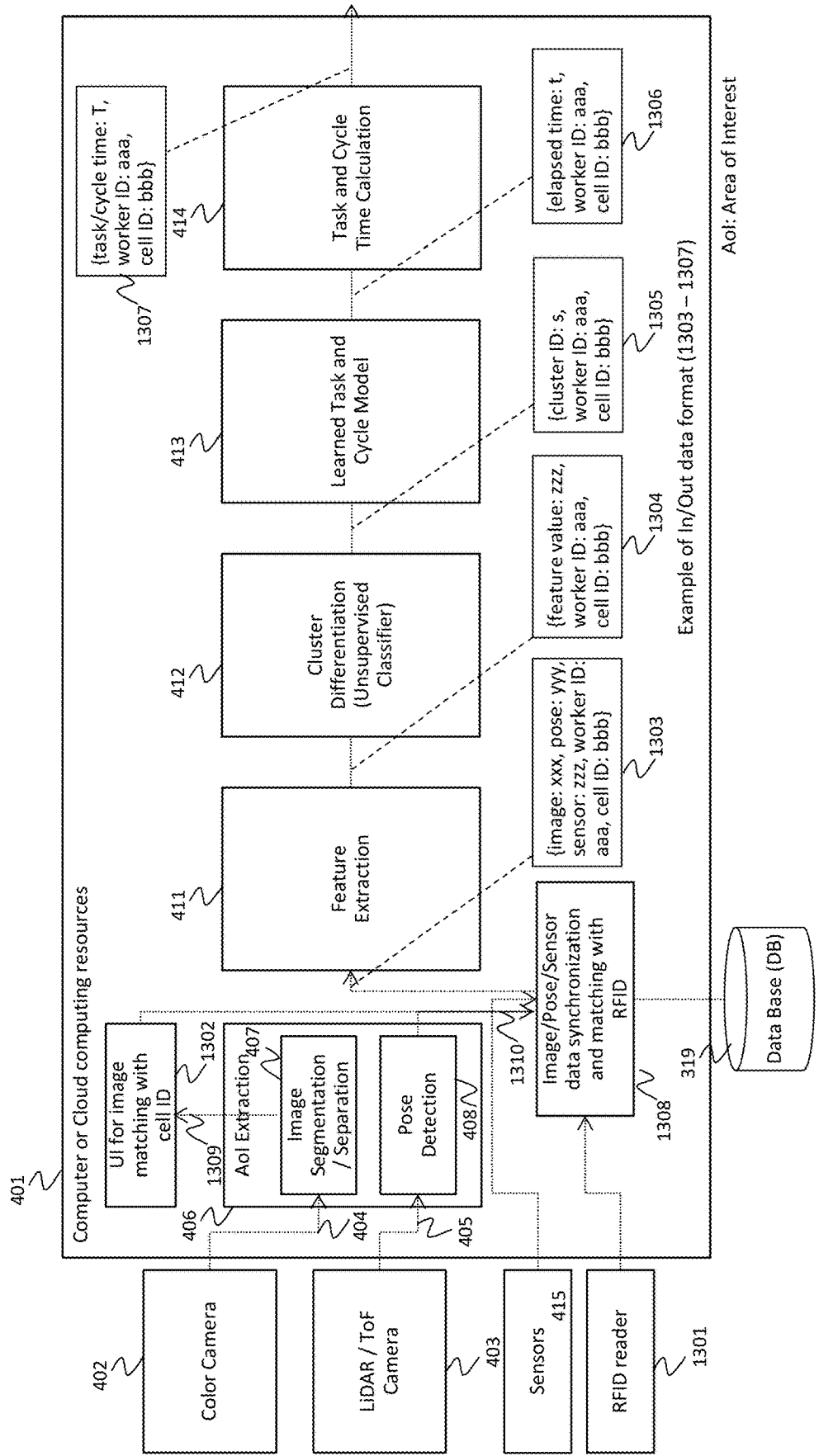
FIG. 13 illustrates an example functional block diagram in computer or cloud computing resources for adding worker/cell IDs, in accordance with an example implementation.
Figure 14:
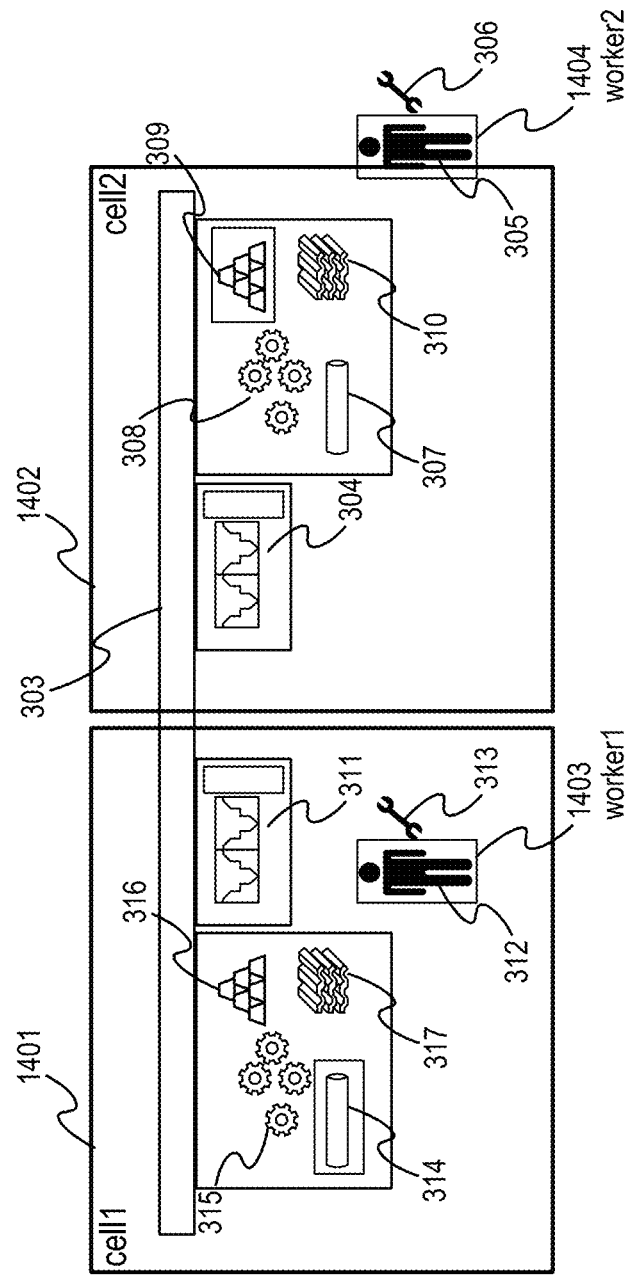
FIG. 14 illustrates an example of separated area of interest images of workers, materials and backgrounds, in accordance with an example implementation.

FIG. 13 illustrates an example functional block diagram in computer or cloud computing resources for adding worker/cell IDs, in accordance with an example implementation. As shown in FIG. 13, in the AoI extraction function block 406, the acquired data are separated into the images of workers, materials, and backgrounds and the worker pose information. FIG. 14 illustrates an example of separated AoI images of workers, materials and backgrounds, in accordance with an example implementation. Of the separated AoIs, with respect to background information, cell IDs information are manually imparted in user interface (UI) 1302 providing a manual input interface of cell IDs. Here, regarding cell ID assignment by manual input to background information, if there is input information of cell IDs from the UI, the older information are updated by overwriting. Otherwise, if there is no input from UI, the latest registered information is inherited. Thus the processed AoI information/pose information 1410, and the reading information from the RFID Reader 1301 are inputted to the Image/Pose/Sensor data synchronization and matching with RFID function Block 1308. In the function block 1308, the worker images and pose information are associated with the RFID information (worker ID) at the moment when workers have RFID tags read by RFID reader, and, in addition, worker images, pose information, sensors data, and RFID information are synchronized.

At this point, the background images are associated with the cell IDs and worker images are associated with the worker IDs. These information is stored in DB 319, then if there is no input information from UI 1302 and reading information from RFID reader, the system gives worker IDs and cell IDs by obtaining the pair information of the background images/cell IDs and worker images/worker IDs from the DB, then calculating the similarity score by applying machine learning techniques, where the two images/poses to be compared are input and the similarity degree is output, to the successively obtained new images/poses. Since output streaming information from the function block 1308 includes worker IDs and cell IDs in addition to the image data, pose data, and sensor data as in 1303, as shown in 1307, it becomes possible to output task/cycle time associated with cell IDs and the worker IDs. Here, all the data from color camera 402, LiDAR/ToF camera 403, and other sensors 415 are combined into a data stream and input into the feature extraction block 411 to output feature values. Further, the combination with the application UI enables the task/cycle time detection process with the worker IDs and cell IDs specified, so it is possible to facilitate immediate access to the necessary information by linking the worker images and background images based on the positional relationship in the original images, such as whether the worker image is within the background image frame, or not. For example, in cell1 1401 the worker image 1403 is within the background frame, but in cell2 1402, the worker image 1404 is not. Here they are associated if within background frame.

Figure 15:
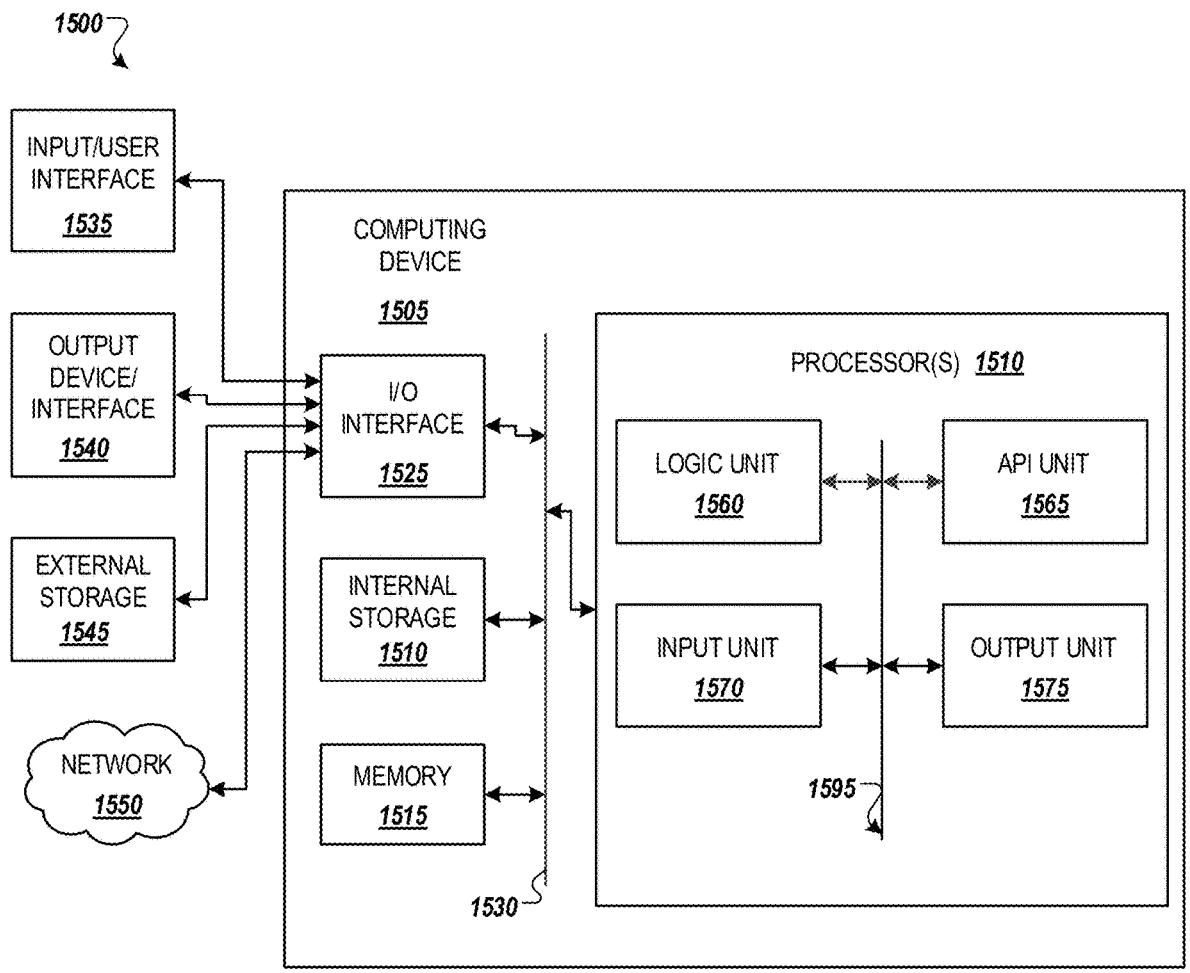
FIG. 15 illustrates an example computing environment with an example computer device suitable for use in some example implementations.

FIG. 15 illustrates an example computing environment with an example computer device suitable for use in some example implementations.

Computer device 1505 in computing environment 1500 can include one or more processing units, cores, or processors 1510, memory 1515 (e.g., RAM, ROM, and/or the like), internal storage 1520 (e.g., magnetic, optical, solid state storage, and/or organic), and/or I/O interface 1525, any of which can be coupled on a communication mechanism or bus 1530 for communicating information or embedded in the computer device 1505. I/O interface 1525 is also configured to receive images from cameras and data from any other sensors/devices or provide images to projectors or displays, depending on the desired implementation.

Computer device 1505 can be communicatively coupled to input/user interface 1535 and output device/interface 1540. Either one or both of input/user interface 1535 and output device/interface 1540 can be a wired or wireless interface and can be detachable. Input/user interface 1535 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1540 may include a display, television, monitor, printer, speaker, braille, or the like. In some example implementations, input/user interface 1535 and output device/interface 1540 can be embedded with or physically coupled to the computer device 1505. In other example implementations, other computer devices may function as or provide the functions of input/user interface 1535 and output device/interface 1540 for a computer device 1505.

Examples of computer device 1505 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1505 can be communicatively coupled (e.g., via I/O interface 1525) to external storage 1545 and network 1550 for communicating with any number of networked components, devices, and systems, including one or more computer devices of the same or different configuration. Computer device 1505 or any connected computer device can be functioning as, providing services of, or referred to as a server, client, thin server, general machine, special-purpose machine, or another label.

I/O interface 1525 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1500. Network 1550 can be any network or combination of networks (e.g., the Internet, local area network, wide area network, a telephonic network, a cellular network, satellite network, and the like).

Computer device 1505 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1505 can be used to implement techniques, methods, applications, processes, or computer-executable instructions in some example computing environments. Computer-executable instructions can be retrieved from transitory media and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1510 can execute under any operating system (OS) (not shown), in a native or virtual environment. One or more applications can be deployed that include logic unit 1560, application programming interface (API) unit 1565, input unit 1570, output unit 1575, and inter-unit communication mechanism 1595 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1565, it may be communicated to one or more other units (e.g., logic unit 1560, input unit 1570, output unit 1575). In some instances, logic unit 1560 may be configured to control the information flow among the units and direct the services provided by API unit 1565, input unit 1570, output unit 1575, in some example implementations described above. For example, the flow of one or more processes or implementations may be controlled by logic unit 1560 alone or in conjunction with API unit 1565. The input unit 1570 may be configured to obtain input for the calculations described in the example implementations, and the output unit 1575 may be configured to provide output based on the calculations described in example implementations.

Processor(s) 1510 can be configured to execute any of the methods below as computer instructions stored in memory 1505.

In a first aspect, there is a method which can involve extracting features from each of a plurality of time-series sensor data, the plurality of time-series sensor data associated with execution of one or more operations; clustering the extracted features into a plurality of tasks that occur from execution of the one or more operations, each of the plurality of tasks associated with a clustering identifier (ID) from the clustering; and calculating a cycle time of the cycle based on the initiation and end of the cycle recognized by referencing a cycle pattern model, wherein the cycle pattern model comprises configuration information of a cycle involving a set from a plurality of the clustering IDs as illustrated in FIG. 4.

In a second aspect, there can be a method such as that in the first aspect, further involving learning the cycle pattern model, the learning the cycle pattern model involving extracting features from each of a plurality of other time-series sensor data, the plurality of other time-series sensor data associated with execution of one or more operations; clustering the extracted features into a plurality of clusters, each of the cluster associated with a clustering identifier (ID) from the clustering; executing frequent pattern extraction on the clustering IDs; associating production operation information received in time series to the clustered features; determining initiation timing that meets a requirement from the production operation information; and determining the clustering ID from the plurality of clustering IDs which corresponds to the initiation of the cycle as illustrated in FIG. 9(A) at 902, 906, 915, 917, 918.

In a third aspect, there can be a method involving any of the above aspects, further involving executing the noise reduction on the subset of clustering IDs by removing ones of the clustering IDs that are not included in the frequent pattern extraction as illustrated in FIG. 9(A) at 916.

In a fourth aspect, there can be a method involving any of the above aspects, further involving removing consecutive duplicated clustering IDs from the extracted features as illustrated in 904 of FIG. 9(A).

In a fifth aspect, there can be a method involving any of the above aspects, further involving conducting order extraction on the subset of clustering IDs over the each time step of the time-series sensor data based on the frequent pattern extraction to learn the cycle pattern model as illustrated at 917 and 918 of FIG. 9(A).

In a sixth aspect there can be a method involving any of the above aspects wherein the learning the cycle further involves, from the production operation information that meets the requirement, calculating a cycle time and a number of the plurality of tasks; and wherein the frequent pattern extraction on the clustering IDs is executed based on one or more of the number of the plurality of tasks or the cycle time; or a number of occurrences of the each of the clustering IDs as illustrated in FIG. 9(B) from S936 onwards. The frequent pattern extraction on the clustering IDs is executed based on the number of the plurality of tasks, the cycle time, and a number of occurrences of the each of the clustering IDs can be conducted in accordance with the flow illustrated in S939 to S943.

Depending on the desired implementation, the method in any of the above aspects can involve the requirement being whether a value from the production operation information satisfies a predetermined threshold as illustrated in 918 of FIG. 9(A) or FIG. 10.

Depending on the desired implementation, the method in any of the above aspects can involve production operation information that includes at least two from worker data, machine data, robot data or material data, wherein the requirement is a correlation threshold between either of the at least two from the worker data, the machine data, the robot data, and the material data as illustrated in FIGS. 10 and 11.

Depending on the desired implementation, the method in any of the above aspects can involve the requirement being a frequent pattern extraction from a pan-matrix profile calculation of the data measurements associated with the one or more time ranges meeting a threshold as illustrated in FIG. 11.

Depending on the desired implementation, the method in any of the above aspects can have the executing frequent pattern extraction on the subset of clustering IDs involve counting a number of different types of the clustering IDs that occur over the each time step in the time-series sensor data; and executing the frequent pattern extraction on the subset of clustering IDs over the each time step based on the different types of the clustering IDs that meet a predetermined criteria as illustrated in FIG. 9(A), 906, 907, and 909.

Depending on the desired implementation, the method in any of the above aspects can have the time series data involve video, and wherein the clustering the extracted features into the plurality of tasks is conducted for each frame of the video as illustrated in FIGS. 3 to 9(A).

As described from FIGS. 3 to 9(A), depending on the desired implementation, the plurality of time-series sensor data can involve input images provided from color cameras and depth cameras; wherein the extracting the features from each of the plurality of input images involves extracting first ones of the plurality of images from the color cameras containing one or more workers, second ones of the plurality of images from the color cameras containing materials associated with the one or more workers, and third ones of the plurality of images from the color cameras involving background information; extracting pose information from fourth ones of plurality of images from the depth cameras of the one or more workers; and extracting the features from the first ones, the second ones, the third ones, and the fourth ones of the plurality of images.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
extracting features from each of a plurality of time-series sensor data, the plurality of time-series sensor data associated with execution of one or more operations;
clustering the extracted features into a plurality of tasks that occur from execution of the one or more operations, each of the plurality of tasks associated with a clustering identifier (ID) from the clustering;
calculating a cycle time of the cycle based on the initiation and end of the cycle recognized by referencing a cycle pattern model, wherein the cycle pattern model comprises configuration information of a cycle comprising a set from a plurality of the clustering IDs; and
learning the cycle pattern model, the learning the cycle pattern model comprising:
extracting features from each of a plurality of other time-series sensor data, the plurality of other time-series sensor data associated with execution of one or more operations,
clustering the extracted features into a plurality of clusters, each of the cluster associated with a clustering identifier (ID) from the clustering,
executing frequent pattern extraction on the clustering IDs,
associating production operation information received in time series to the clustered features,
determining initiation timing that meets a requirement from the production operation information, and
determining the clustering ID from the plurality of clustering IDs which corresponds to the initiation of the cycle.

2. The method of claim 1, further comprising executing the noise reduction on the subset of clustering IDs by removing ones of the clustering IDs that are not included in the frequent pattern extraction.

3. The method of claim 1, further comprising removing consecutive duplicated clustering IDs from the extracted features.

4. The method of claim 1, further comprising conducting order extraction on the subset of clustering IDs over the each time step of the time-series sensor data based on the frequent pattern extraction to learn the cycle pattern model.

5. The method of claim 1, wherein the learning the cycle further comprises:
from the production operation information that meets the requirement, calculating a cycle time and a number of the plurality of tasks;
wherein the frequent pattern extraction on the clustering IDs is executed based on:
one or more of the number of the plurality of tasks or the cycle time; or
a number of occurrences of the each of the clustering IDs.

6. The method of claim 5, wherein the requirement is that whether a value from the production operation information satisfies a predetermined threshold.

7. The method of claim 5, wherein the production operation information includes at least two from worker data, machine data, robot data or material data, wherein the requirement is a correlation threshold between either of the at least two from the worker data, the machine data, the robot data, and the material data.

8. The method of claim 5, wherein the requirement is a frequent pattern extraction from a pan-matrix profile calculation of the data measurements associated with the one or more time ranges meeting a threshold.

9. The method of claim 1, wherein the executing frequent pattern extraction on the subset of clustering IDs comprises:
counting a number of different types of the clustering IDs that occur over the each time step in the time-series sensor data; and
executing the frequent pattern extraction on the subset of clustering IDs over the each time step based on the different types of the clustering IDs that meet a predetermined criteria.

10. The method of claim 1, wherein the time series data comprises video, and wherein the clustering the extracted features into the plurality of tasks is conducted for each frame of the video.

11. The method of claim 1, wherein the plurality of time-series sensor data comprises input images provided from color cameras and depth cameras;
wherein the extracting the features from each of the plurality of input images comprises:
extracting first ones of the plurality of images from the color cameras containing one or more workers, second ones of the plurality of images from the color cameras containing materials associated with the one or more workers, and third ones of the plurality of images from the color cameras comprising background information;
extracting pose information from fourth ones of plurality of images from the depth cameras of the one or more workers; and
extracting the features from the first ones, the second ones, the third ones, and the fourth ones of the plurality of images.

12. A non-transitory computer readable medium, storing instructions for executing a process, the instructions comprising:
extracting features from each of a plurality of time-series sensor data, the plurality of time-series sensor data associated with execution of one or more operations;
clustering the extracted features into a plurality of tasks that occur from execution of the one or more operations, each of the plurality of tasks associated with a clustering identifier (ID) from the clustering;
calculating a cycle time of the cycle based on the initiation and end of the cycle recognized by referencing a cycle pattern model, wherein the cycle pattern model comprises configuration information of a cycle comprising a set from a plurality of the clustering IDs; and
learning the cycle pattern model, the learning the cycle pattern model comprising:
extracting features from each of a plurality of other time-series sensor data, the plurality of other time-series sensor data associated with execution of one or more operations, clustering the extracted features into a plurality of clusters, each of the cluster associated with a clustering identifier (ID) from the clustering, executing frequent pattern extraction on the clustering IDs, associating production operation information received in time series to the clustered features, determining initiation timing that meets a requirement from the production operation information, and determining the clustering ID from the plurality of clustering IDs which corresponds to the initiation of the cycle.

13. An apparatus, comprising:

a processor, configured to:

extract features from each of a plurality of time-series sensor data, the plurality of time-series sensor data associated with execution of one or more operations;

cluster the extracted features into a plurality of tasks that occur from execution of the one or more operations, each of the plurality of tasks associated with a clustering identifier (ID) from the clustering;

calculate a cycle time of the cycle based on the initiation and end of the cycle recognized by referencing a cycle pattern model, wherein the cycle pattern model comprises configuration information of a cycle comprising a set from a plurality of the clustering IDs; and learn the cycle pattern model, the learn the cycle pattern model comprising:

extract features from each of a plurality of other time-series sensor data, the plurality of other time-series sensor data associated with execution of one or more operations, cluster the extracted features into a plurality of clusters, each of the cluster associated with a clustering identifier (ID) from the clustering, execute frequent pattern extraction on the clustering IDs, associate production operation information received in time series to the clustered features, determine initiation timing that meets a requirement from the production operation information, and determine the clustering ID from the plurality of clustering IDs which corresponds to the initiation of the cycle.

* * * * *